United States Patent [19]
Ise

[11] Patent Number: 5,510,814
[45] Date of Patent: Apr. 23, 1996

[54] DRIVE VOLTAGE GENERATING DEVICE FOR LIQUID CRYSTAL DISPLAY DEVICE

[75] Inventor: Masahiro Ise, Kashihara, Japan

[73] Assignee: Sharp Kabushiki Kaisha, Osaka, Japan

[21] Appl. No.: 298,678

[22] Filed: Aug. 31, 1994

[30] Foreign Application Priority Data

Aug. 31, 1993 [JP] Japan .................................. 5-216668
Mar. 31, 1994 [JP] Japan .................................. 6-063539

[51] Int. Cl.$^6$ .............................. H02M 3/18; G09G 3/36
[52] U.S. Cl. ................................................ 345/211; 345/95
[58] Field of Search ........................ 345/94–97, 98–100, 345/211–213, 204; 359/84, 85, 53, 54, 55; 363/324–326, 60, 63; 368/204, 203, 156; 327/108; 323/225, 297

[56] References Cited

U.S. PATENT DOCUMENTS

| | | |
|---|---|---|
| 4,279,010 | 7/1981 | Morihisa . |
| 4,570,115 | 2/1986 | Misawa et al. .................... 345/212 |
| 4,802,739 | 2/1989 | Iwamoto ............................ 359/85 |
| 4,807,104 | 2/1989 | Floyd et al. . |
| 5,229,761 | 7/1993 | Fuse ................................... 345/211 |

FOREIGN PATENT DOCUMENTS

| | | |
|---|---|---|
| 0225644 | 6/1987 | European Pat. Off. . |
| 0386261 | 9/1990 | European Pat. Off. . |
| 48-74120 | 10/1973 | Japan . |
| 49-35074 | 4/1974 | Japan . |
| 49-44781 | 4/1974 | Japan . |
| 62-144566 | 6/1987 | Japan . |
| 62-49822 | 10/1987 | Japan . |
| 5-6424 | 1/1993 | Japan . |
| 2078021 | 12/1981 | United Kingdom . |

Primary Examiner—Richard A. Hjerpe
Assistant Examiner—Steven J. Saras
Attorney, Agent, or Firm—Birch, Stewart, Kolash & Birch

[57] ABSTRACT

A drive voltage generating device for a liquid crystal display device includes a terminal voltage supply source for generating an output voltage of $V_S$, an actuating voltage supply source for generating an output voltage of $V_E$, and a plurality of circuit sections. Each circuit section is composed of a first capacitor for storing therein a charge supplied from the terminal voltage supply source, a second capacitor for storing therein a charge transferred from the first capacitor an output terminal section for receiving a voltage $V_S$ from the second capacitor and a switch for switching respective connections between the terminal voltage supply source and the first capacitor, and between the first and second capacitors. The switch is provided for switching between an operation for supplying a charge from the terminal voltage supply source to the first capacitor and an operation for transferring a charge stored in the first capacitor to the second capacitor.

15 Claims, 8 Drawing Sheets

DRIVE VOLTAGE GENERATING DEVICE FOR LIQUID CRYSTAL DISPLAY DEVICE

FIELD OF THE INVENTION

The present invention relates to a drive voltage generating device for a liquid crystal display device, which generates a drive voltage for driving a liquid crystal display panel.

BACKGROUND OF THE INVENTION

Conventionally, a six-level drive system is adopted in liquid crystal display devices of a simple-matrix type (including liquid crystal display devices of the same drive system such as MIM (Metal Insulator Metal), etc.). In the six-level drive system, a liquid crystal display panel is driven by supplying a potential of six levels to a liquid crystal driver from a drive voltage generating device. Therefore, in order to drive portable devices using batteries, it is required to set the voltage to be supplied to the liquid crystal driver higher than a voltage of a self-contained battery, and also to have potentials of six levels.

First, as a technique for achieving a voltage higher than a voltage from a power source, for example, a method for transferring a charge in a condenser may be used. This technique for achieving a higher voltage is enabled, for example, from a circuit shown in FIG. 3 of "voltage boosting circuit for electronic watches" disclosed in Japanese Examined Patent Publication No. 6424/1993 (Tokukohei 5-6424) and from a circuit shown in FIG. 1 of "up-voltage circuit" disclosed in Japanese Examined Patent Publication No. 49822/1987 (Tokukosho 62-49822).

The technique for achieving a higher voltage than the voltage of the power source by transferring the charge in the condenser also can be achieved from a Cockcroft circuit shown in FIG. 2 of "portable digital electronic device" disclosed in Japanese Laid-Open Patent Publication No. 74120/1973 (Tokukaisho 48-74120), a Schankel circuit shown in FIG. 3 of "digital electronic device" disclosed in Japanese Laid-Open Patent Publication No. 44781/1974 (Tokukaisho 49-44781), and Cockcroft and Schankel circuits shown in FIG. 2 of "digital electronic device" disclosed in Japanese Laid-Open Patent Publication No. 35074/1974 (Tokukaisho 49-35074).

However, all of the described voltage boosting circuits are designed for achieving a higher voltage than an original voltage generated from the power source and a potential of one level using a single power source and a capacitor. Therefore, it is difficult to modify the circuits so as to supply potentials of six levels to the liquid crystal driver.

Figure 10:
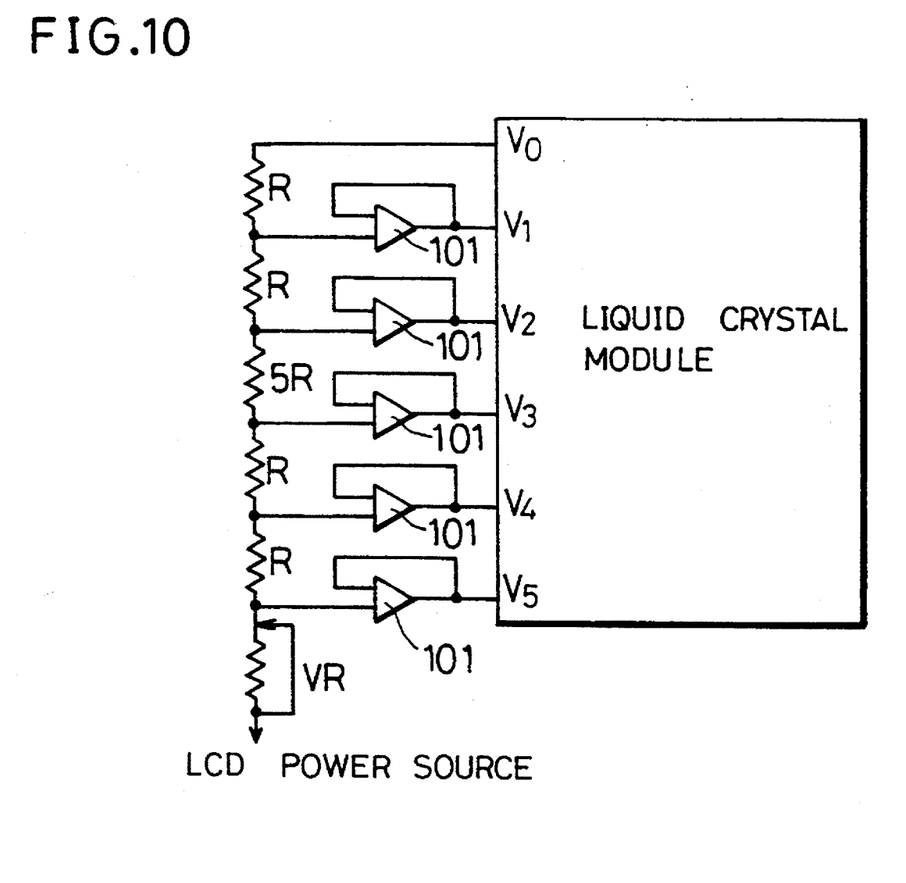
FIG. 10 is a circuit diagram showing a conventional drive voltage generating device in a liquid crystal display device.

In order to solve the above problem, as another technique for achieving potentials of six levels from the single power source, for example, as shown in FIG. 10, a method for supplying a voltage divided by a resistance R to a liquid crystal driver IC through an operational amplifier 101 which is voltage follower connected has been proposed. (Details are shown in FIG. 6.18, page 403 of the handbook for the liquid crystal device of the 142nd meeting of Nippon Gakujutsu Shinkokai published by Nikkan Industrial Newspaper Publishing company, and sections related to "T6A04" of IC data sheet of Toshiba Co., Ltd.) A variable resistance VR shown in FIG. 10 is provided for adjusting the contrast.

In the described arrangement where the operational amplifier 101 is voltage follower connected, current flowing in a bleeder resistance can be significantly reduced compared with the arrangement where the voltage is simply divided by the resistance, thereby improving the accuracy of the output voltage.

However, the described conventional arrangement has the following factors of increasing power consumption, and the conventional techniques have not yet found a satisfactory solution to this problem.

(1) As a supply power source to the operational amplifier 101, a voltage between output terminal voltages $V_0$ and $V_5$ is used, and each difference between an input terminal voltage and output terminal voltage $V_1$–$V_4$ is large. Therefore, in operating at a constant voltage, the difference in the voltage is absorbed by the operational amplifier 101 as heat as in the case of a series regulator.

(2) In addition to the energy supply from output terminal voltages $V_1$ through $V_4$, the operational amplifier 101 also absorbs a charge stored in a component of a condenser of liquid crystal. Therefore, the charge which is to be stored as electronic energy is also absorbed by the operational amplifier 101 as heat.

(3) In the case where displayed data greatly changes, such as a display which inverts ON/OFF at every line, a large control current is required for the constant maintenance of the output from the operational amplifier 101 following each change.

SUMMARY OF THE INVENTION

An object of the present invention is to provide a drive voltage generating device for a liquid crystal display device which ensures a reduction in electric power consumption.

In order to achieve the above objective, the first drive voltage generating device for the liquid crystal display device in accordance with the present invention is characterized by comprising:

a voltage supply source for generating a prescribed voltage;

first charge storing means for storing therein a charge supplied from the voltage supply source;

second charge storing means corresponding to the first charge storing means, for storing therein a charge transferred from the first charge storing means;

an output terminal section including a plurality of output terminals for supplying a voltage required for driving a liquid crystal display section; and switching means for switching a connection between the voltage supply source and the first charge storing means and a connection between the first charge storing means and the second charge storing means so that a charge is supplied to the first charge storing means from the voltage supply source and that a charge stored in the first charge storing means is transferred to the second charge storing means.

According to the above arrangement, a charge supplied from the voltage supply source is first stored in the first charge storing means. Thereafter, the charge is transferred from the first charge storing means to the second charge storing means. As a result, a prescribed voltage can be obtained from each pair of output terminals connected to the second charge storing means. Therefore, unlike the case where a voltage is obtained from the output terminals through the operational amplifier, the electric energy is not converted into heat nor consumed, thereby saving the electric power consumption.

The second drive voltage generating device for the liquid crystal display device in accordance with the present invention having the arrangement of the first drive voltage generating device is characterized by including three circuit sections as a unit, each circuit section being composed of the first charge storing means, the second charge storing means and the switching means.

According to the above arrangement, since three circuit sections, each being composed of the first charge storing means, the second charge storing means and the switching means are provided as a unit, potentials of six levels can be generated. Therefore, the second drive voltage generating device is suitably applied to a drive circuit of a six level driving system for driving a simple matrix-type liquid crystal display, etc.

The third drive voltage generating device for the liquid crystal display device in accordance with the present invention having the arrangement of the first or the second drive voltage generating device for the liquid crystal display device is characterized in that the switching means is composed of two switching circuits, each being provided with a MOS (metal oxide semiconductor) type FET (field effect transistor) wherein the MOS type FET of one of the two switching circuits is not driven in accordance with a switching of a parasitic diode generated by a back gate effect of the MOS type FET, while the MOS type FET of the other switching circuit is driven in accordance with a switching of a parasitic diode to be generated by the back gate effect of the MOS type FET.

According to the described arrangement, the switching means is composed of two switching circuits, each being provided with the MOS type FET wherein the MOS type FET of one of the two switching circuits is not driven in accordance with a switching of a parasitic diode generated by the back gate effect of the MOS type FET, while the MOS type FET of the other switching circuit is driven in accordance with the switching of a parasitic diode generated by the back gate effect of the MOS type FET. Since the above arrangement offers low ON resistance and small drop in the voltage in the switch, loss in transferring the charge from the voltage supply source to the first charge storing means and in transferring the charge from the first charge storing means to the second charge storing means can be significantly reduced. Therefore, compared with the case of using the diode instead of the FET, where the forward voltage cannot be ignored, such as a silicon diode having a forward voltage of around 0.7 V, an improved conversion efficiency can be achieved.

Therefore, an electric power required for converting a charge stored in the first charge storing means to be stored in the second charge storing means can be reduced, thereby achieving a reduction in the electric power consumption in the entire device.

The invention and its various advantages will become more apparent to those skilled in the art from the ensuing detailed description of preferred embodiments, reference being made to the accompanying drawings.

BRIEF DESCRIPTION OF THE DRAWINGS

FIG. 6($a$) and FIG. 6($b$) show respective waveforms of control signals generated from the timing circuit shown in FIG. 5, wherein FIG. 6($a$) is a waveform diagram of a control signal $S_N$, and FIG. 6($b$) is a waveform diagram of a control signal $S_P$.

DETAILED DESCRIPTION OF PREFERRED EMBODIMENTS

[EMBODIMENT 1]

Figure 2:
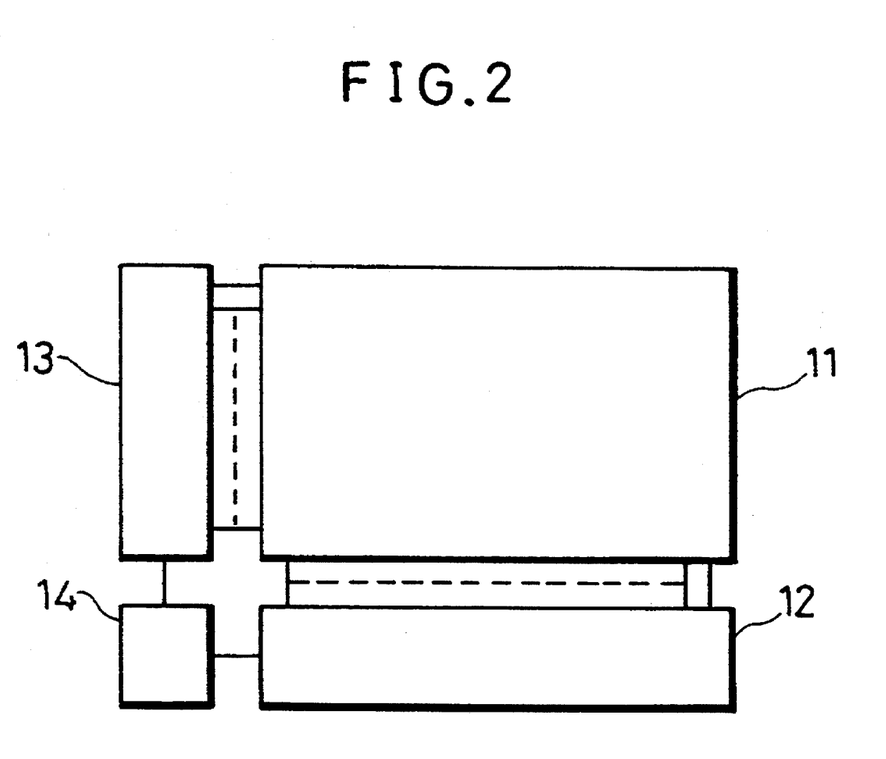
FIG. 2 is an explanatory view showing the schematic configuration of the liquid crystal display device provided with the drive voltage generating device.

A liquid crystal display device in accordance with the present embodiment has a configuration shown in FIG. 2. A segment driver 12 and a common driver 13 are connected to a liquid crystal display panel 11 (liquid crystal display section). Further, a drive voltage generating device 14 is connected to both the segment driver 12 and the common driver 13.

Figure 1:
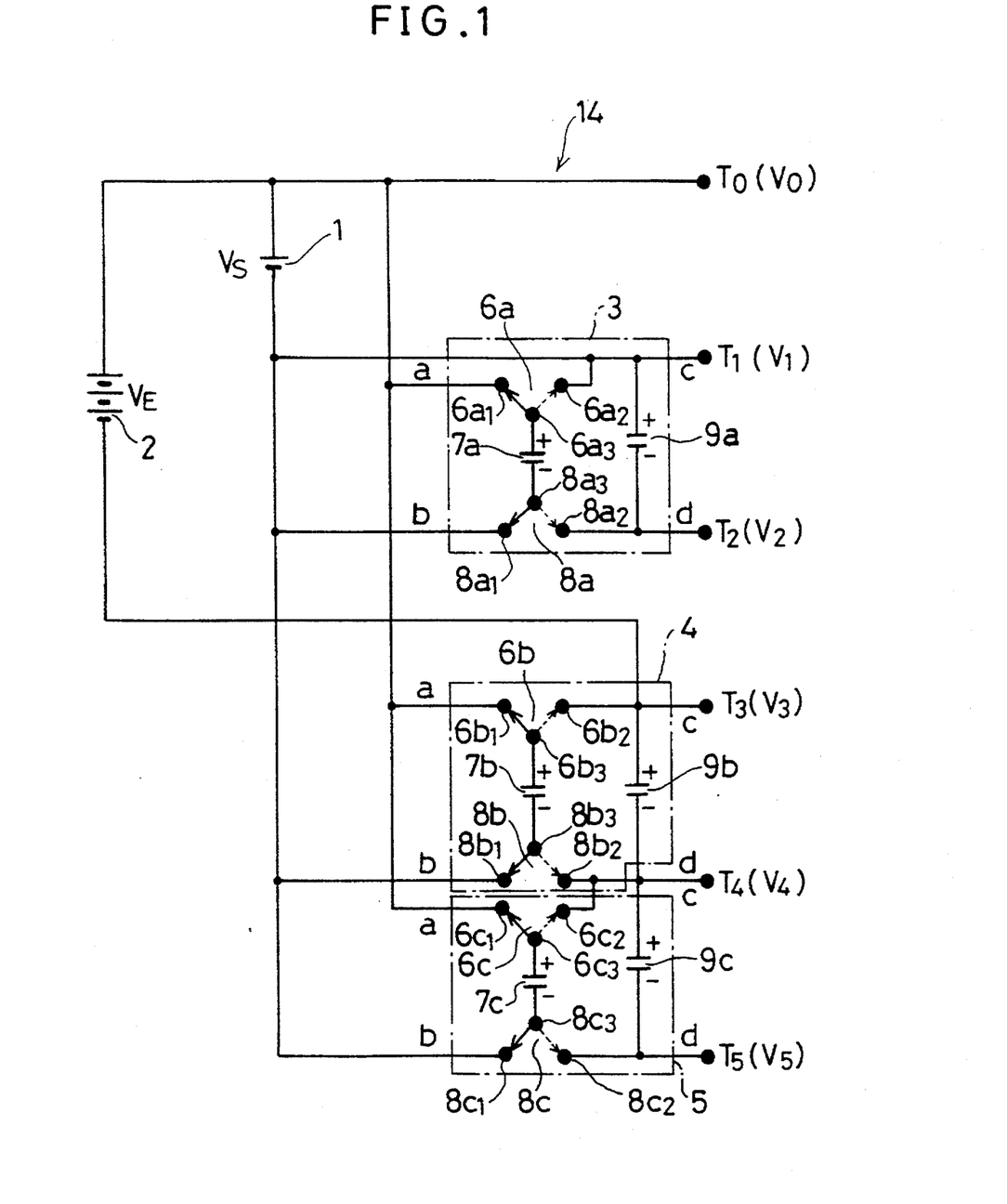
FIG. 1 is a schematic circuit diagram showing a drive voltage generating device for use in a liquid crystal display device having a basic configuration of one embodiment of the present invention.

First, the basic configuration of the drive voltage generating device 14 in accordance with the drive voltage generating device for the liquid crystal display device of the present invention will be explained below. As shown in FIG. 1, the drive voltage generating device 14 is provided with a terminal voltage supply source 1 (voltage supply source) having an output voltage of $V_S$ and an actuating voltage supply source 2 having an output voltage of $V_E$, a first circuit 3 (circuit section), a second circuit 4 (circuit section) and a third circuit 5 (circuit section).

The terminal voltage supply source 1 is provided for applying an output voltage to each of output terminals $T_0$ through $T_5$ (output terminal section), wherein an anode thereof is connected to the output terminal $T_0$, and a cathode thereof is connected to the output terminal $T_1$. However, the connection of the anode and cathode of the terminal voltage supply source 1 is not limited between $T_0$ and $T_1$, the connection may be provided between any set of output terminals selected among $T_1$ and $T_2$, $T_3$ and $T_4$, and $T_4$ and $T_5$.

The actuating voltage supply source 2 is provided for applying an actuating voltage to the liquid crystal display panel 11 when applying a negative voltage, wherein an anode thereof is connected to the output terminal $T_0$, and a cathode thereof is connected to the output terminal $T_3$. However, the connection of the anode and cathode of the actuating voltage supply source 2 is not limited to the above.

The anode may be connected to either one of output terminals $T_0$, T and $T_2$, and the cathode thereof may be connected either one of the output terminals $T_3$, $T_4$ and $T_5$.

Here, the output voltages from the output terminals $T_0$ through $T_5$ are respectively designated by $V_0$ through $V_5$. Here, the output terminal $T_0$ is a voltage reference point (GND).

The first circuit section 3 is provided with a switch 6a (switching means), a capacitor 7a (first charge storing means), a switch 8a (switching means) and a capacitor 9a (second charge storing means).

The switches 6a and 8a switch for transferring a charge from the terminal voltage supply source 1 to the condenser 9a after being stored in the condenser 7a. The switches 6a and 8a are switching elements such as transistors, FETs, etc. In the present embodiment, MOS type FETs (to be described later) are respectively used as switching elements for the switches 6a and 8a.

The switch 6a is composed of a fixed terminal $6a_1$, a fixed terminal $6a_2$ and a switching terminal $6a_3$. The fixed terminal $6a_1$ is connected to the output terminal $T_0$, and the fixed terminal $6a_2$ is connected to the output terminal $T_1$. The switching terminal $6a_3$ is provided for switching the connecting end of the capacitor 7a between the fixed terminal $6a_1$ and the fixed terminal $6a_2$.

Similarly, the switch 8a is composed of a fixed terminal $8a_1$, a fixed terminal $8a_2$ and a switching terminal $8a_3$. The fixed terminal $8a_1$ is connected to the cathode of the terminal voltage supply source 1, and the fixed terminal $8a_2$ is connected to the output terminal $T_2$. The switching terminal $8a_3$ is provided for switching the connecting end of the capacitor 7a between the fixed terminal $8a_1$ and the fixed terminal $8a_2$.

The capacitor 7a is provided for temporarily storing a voltage $V_s$, i.e., the charge of the terminal voltage supply source 1. One end of the capacitor 7a is connected to the switching terminal $6a_3$ of the switch 6a, and the other end is connected to the switching terminal $8a_3$ of the switch 8a.

Therefore, the switches 6a and 8a respectively switch switching terminals $6a_1$ and $8a_3$ between fixed terminals $6a_1$ and $6a_2$ and the fixed terminals $8a_1$ and $8a_2$, so as to store the charge from the terminal voltage supply source 1 in the capacitor 7a, and thereafter transfer the charge to the capacitor 9a. The capacitor 9a is provided for applying a voltage across the output terminals $T_1$ and $T_2$, which is to be finally applied to the liquid crystal display panel 11 (see FIG. 2). The capacitor 9a is provided between the output terminals $T_1$ and $T_2$.

The second circuit section 4 is provided with a switch 6b (switching means), a switch 8b (switching means), a capacitor 7b (first charge storing means) and a capacitor 9b (second charge storing means) respectively corresponding to the switch 6a, the switch 8a, the capacitor 7a and the capacitor 9a of the first circuit section 3. The connections among the switch 6b, the switch 8b, the capacitor 7b and the capacitor 9b are the same as the connections among the switch 6a, the switch 8a, the capacitor 7a and the capacitor 9a of the first circuit section 3. The switch 6b is arranged such that the fixed terminal $6b_1$ is connected to the output terminal $T_0$ and to the anode of the terminal voltage supply source 1, while the fixed terminal $6b_2$ is connected to the output terminal $T_3$. The switch 8b is arranged such that the fixed terminal $8b_1$ is connected to the cathode of the terminal voltage supply source 1, while the fixed terminal $8b_2$ is connected to the output terminal $T_4$. The capacitor 9b is provided between the output terminals $T_3$ and $T_4$.

The third circuit section 5 is provided with a switch 6c (switching means), a switch 8c (switching means), a capacitor 7c (first charge storing means) and a capacitor 9c (second charge storing means) respectively corresponding to the switch 6a, the switch 8a, the capacitor 7a and the capacitor 9a of the first circuit section 3. The connections among the switch 6c, the switch 8c, the capacitor 7c and the capacitor 9c are the same as the connections among the switch 6a, the switch 8a, the capacitor 7a and the capacitor 9a of the first circuit section 3. The switch 6c is arranged such that the fixed terminal $6c_1$ is connected to the output terminal $T_0$ and to the anode of the terminal voltage supply source 1, while the fixed terminal $6c_2$ is connected to the output terminal $T_4$. The switch 8c is arranged such that the fixed terminal $8c_1$ is connected to the cathode of the terminal voltage supply source 1, and the fixed terminal $8c_2$ is connected to the output terminal $T_5$. The capacitor 9c is provided between the output terminals $T_4$ and $T_5$.

The switches 6a, 6b and 6c and the switches 8a, 8b and 8c are controlled so as to be simultaneously switched in the same direction by control means (not shown).

In the described arrangement, the operation of the first circuit section 3 when the drive voltage generating device 14 is activated will be explained below.

First, the switching terminal $6a_3$ of the switch 6a and the switching terminal $8a_3$ of the switch 8a are respectively switched to the side of the fixed terminal $6a_1$ and the fixed terminal $8a_1$ as shown in the solid line in the figure.

Therefore, the current flows as follows: the terminal voltage supply source 1→the switch 6a→the capacitor 7a→the switch 8a→the terminal voltage supply source 1. As a result, the charge having the polarity shown in the figure is stored in the capacitor 7a. Therefore, the described switching periods for the switch 6a and the switch 8a correspond to the charging period, and in a steady state, both ends of the capacitor 7a have a voltage of $V_s$.

Next, the switching terminal $6a_3$ of the switch 6a and the switching terminal $8a_3$ of the switch 8a are respectively switched to the fixed terminal $6a_2$ and the fixed terminal $8a_2$ as shown by a dotted line.

Therefore, the current flows as follows: the capacitor 7a→the switch 6a→the capacitor 9a→the switch 8a→the capacitor 7a. Here, the described switching periods for the switch 6a and the switch 8a correspond to the discharging period. In this case, a charge is stored in an amount corresponding to the capacity ratio of the capacitor 7a to the capacitor 9a, and both ends of the two capacitors become identical. For example, in the case where the charge originally stored in the capacitor 9a is 0, and the electrostatic capacity of the capacitors 7a and 9a are $C_0$, the charges to be stored in the capacitors 7a and 9a are $C_0 V_s/2$.

Therefore, by the switching operations of the switch 6a and the switch 8a, the charging and discharging operations are repeated. Thus, the voltage $V_a$ of both ends of the capacitors 9a converges to $V_s$ as shown by the following equation. As a result, the potential of the output terminal $T_2$ is dropped to $-2V_s$.

$$V_a = V_s(\tfrac{1}{2}+\tfrac{1}{4}+\tfrac{1}{8}+\tfrac{1}{16}+\ldots) \to V_s \quad (1)$$

On the other hand, in the case where the load is connected to the capacitor 9a, as the time required for charging the voltage $V_s$ to the capacitor 7a is short, the charging period is set shorter than the discharging period so that the charging period can be even ignored. In this case, the variation in the output voltage, i.e., the ripple voltage $\Delta V$ can be calculated through the following equation:

$$\Delta V = I_0/(2C_0 f_0) \quad (2),$$

wherein $I_0$(A) and $f_0$(Hz) respectively represent the average load current and the switching frequency of the switch 6a.

Accordingly, the switching frequency $f_0$ of the switch 6a and the electrostatic capacity $C_0$ of the capacitors 7a and 9a may be set based on the desired average load current $I_0$ and the ripple voltage $\Delta V$ as desired.

Additionally, the respective operations of the second circuit section 4 and the third circuit section 5 are almost the same as the operation of the first circuit section 3.

More specifically, in the second circuit section 4, the current flows in the charging period as follows: the terminal voltage supply source 1→the switch 6b→the capacitor 7b→the switch 8b→the terminal voltage supply source 1. As a result, the capacitor 7b is charged so as to have the polarity shown in the figure. On the other hand, in the discharging period, the current flows as follows: the capacitor 7b→the switch 6b→the capacitor 9b→the switch 8b →the capacitor 7b. The capacitor 9b is connected between output terminals $T_3$ and $T_4$, and the cathode of the actuating voltage supply source 2 is connected to the output terminal $T_3$. Therefore, the potential of the output terminal $T_3$ becomes $-V_E$, and the potential of the output terminal $T_4$ becomes $-(V_E+V_S)$.

Similarly, in the third circuit section 5, the current flows in the charging period as follows: the terminal voltage supply source 1→the switch 6c→the capacitor 7c→the switch 8c→the terminal voltage supply source 1. As a result, the capacitor 7c is charged so as to have the polarity shown in the figure. On the other hand, in the discharging period, the current flows as follows: the capacitor 7c→the switch 6c→the capacitor 9c→the switch 6c→the capacitor 7c. The capacitor 9c is connected between the output terminals $T_4$ and $T_5$. Therefore, the potential of the output terminal $T_5$ becomes $-(V_E+2V_S)$.

As described, the drive voltage generating device 14 of the present embodiment is arranged such that the respective voltages between output terminals $T_0$ and $T_1$, $T_1$ and $T_2$, $T_3$ and $T_4$, and $T_4$ and $T_5$ are set to $V_S$, and the voltage between output terminals $T_0$ and $T_5$ is set to $(V_E+2V_S)$. Additionally, the bias ratio B in driving liquid crystal and the peak drive voltage $V_{op}$ can be obtained respectively through the following equations:

$$1/B = V_S/(V_0-V_5) \quad (3)$$

$$V_{op} = V_E + 2V_S \quad (4)$$

Next, the drive voltage generating device 14 of the present embodiment will be explained in more details below in reference to FIG. 3 through FIG. 6.

Figure 3:
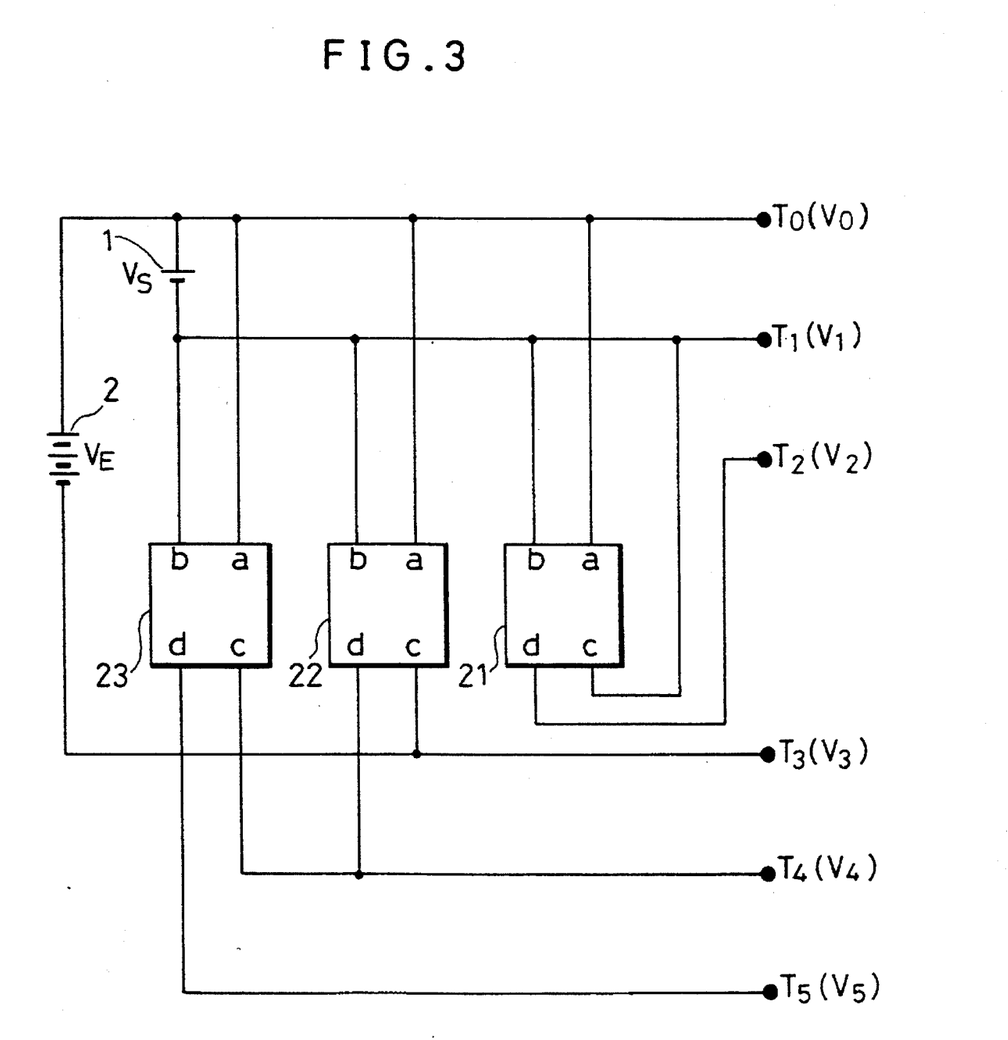
FIG. 3 is a view showing a schematic configuration of the drive voltage generating device for the liquid crystal display device in accordance with one embodiment employing the drive voltage generating device for the liquid crystal display device having the basic configuration of FIG. 1.

The drive voltage generating device 14 shown in FIG. 3 is provided with the same terminal voltage supply source 1 and the actuating voltage supply source 2 as the drive voltage generating device 14 shown in FIG. 1. In the drive voltage generating device 14 shown in FIG. 3, the first circuit section 21 (circuit section), the second circuit section 22 (circuit section) and the third circuit section 23 (circuit section) which respectively correspond to the first circuit section 3, the second circuit section 4 and the third circuit section 5 shown in FIG. 1 are provided.

The respective terminals a of the first circuit section 21, the second circuit section 22 and the third circuit section 23 are connected to the anode of the terminal voltage supply source 1, while the respective terminals b are connected to the cathode of the terminal voltage supply source 1. The terminal c of the first circuit section 21 is connected to the output terminal $T_1$, while the terminal d is connected to the output terminal $T_2$. The terminal c of the second circuit section 22 is connected to the output terminal $T_3$, while the terminal d is connected to the output terminal $T_4$. The terminal c of the third circuit section 23 is connected to the output terminal $T_4$, while the terminal d is connected to the output terminal $T_5$.

The anode of the terminal voltage supply source 1 is connected to the output terminal $T_0$, and the cathode thereof is connected to the output terminal $T_1$. On the other hand, the anode of the actuating voltage supply source 2 is connected to the output terminal $T_0$, while the cathode thereof is connected to the output terminal $T_3$.

Figures 4, 5:
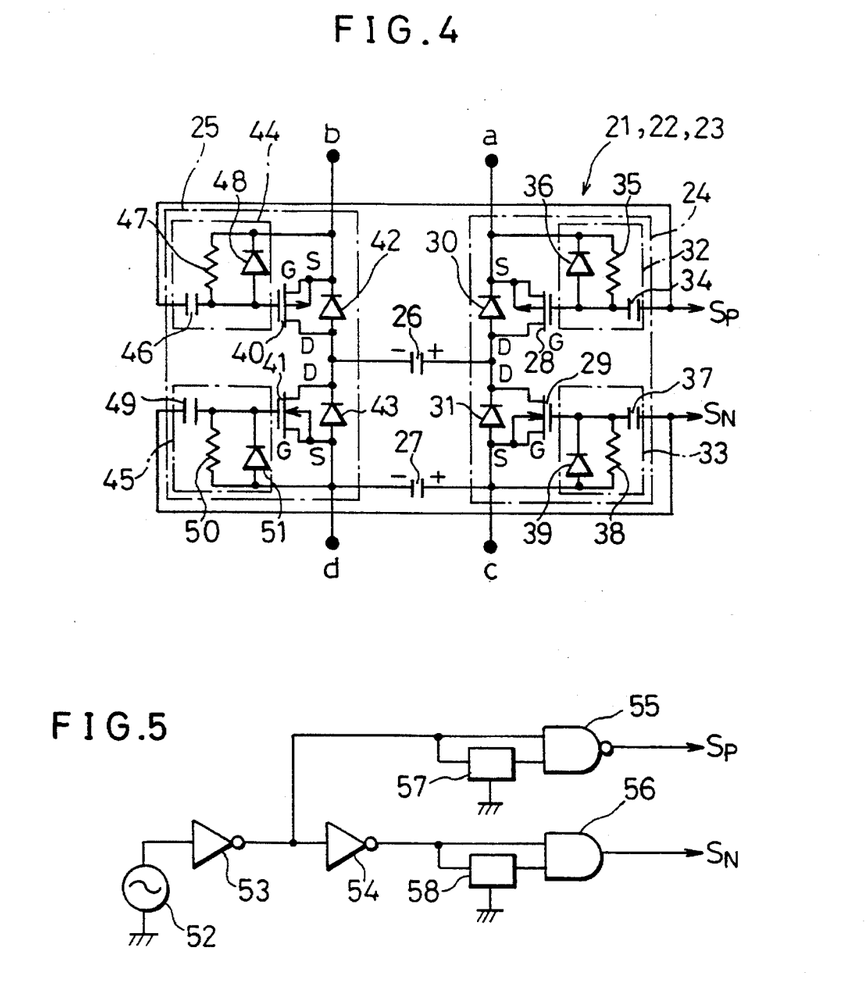
FIG. 4 is a schematic circuit diagram showing each circuit in the drive voltage generating device for the liquid crystal display device of FIG. 3.
FIG. 5 is a schematic block diagram showing a timing circuit for generating a control signal for controlling the switching timing of a MOS-type FET provided in the drive voltage generating device for the liquid crystal display device shown in FIG. 3.

The described first circuit section 21, second circuit section 22 and third circuit section 23 have mutually the same configuration. Namely, as shown in FIG. 4, each circuit is provided with the first switching circuit 24 (switching circuit), the second switching circuit 25 (switching circuit), a capacitor 26 (first charge storing means) and a capacitor 27 (second charge storing means).

The first switching circuit 24 corresponds to the respective switches 6a, 6b and 6c of the first circuit section 3, the second circuit section 4 and the third circuit section 5 of FIG. 1. The first switching circuit 24 is provided with P channel MOS (Metal Oxide Semiconductor) type FET (hereinafter referred to as Pch-MOS type FET) 28 (MOS type FET) and N channel MOS type FET (hereinafter referred to as Nch-MOS type FET) 29 (MOS type FET) as switching elements. Between the source (S) terminal and the drain (D) terminal of the Pch-MOS type FET 28, a parasitic diode 30 is generated by the back gate effect of the Pch-MOS type FET 28. On the other hand, between the S terminal and the D terminal of the Nch-MOS type FET 29, a parasitic diode 31 is generated by the back gate effect of the Nch-MOS type FET 29. Namely, the cathode of the parasitic diode 30 is connected to the S terminal of the Pch-MOS type FET 28, and the anode is connected to the D terminal of the Pch-MOS type FET 28. On the other hand, the cathode of the parasitic diode 31 is connected to the D terminal of the Nch-MOS type FET 29, and the anode is connected to the S terminal of the Nch-MOS type FET 29.

The first switching circuit 24 is provided with the first gate driving-use clamping circuit 32 and the second gate driving-use clamping circuit 33. The first gate driving-use clamping circuit 32 is provided for applying a voltage to a gate (G) terminal of the Pch-MOS type FET 28, while the second gate driving-use clamping circuit 33 is provided for applying a voltage to the G terminal of the Nch-MOS type FET 29.

The first gate driving-use clamping circuit 32 is driven based on a control signal $S_P$ to be outputted from a timing circuit (to be described later), while the second driving-use clamping circuit 33 is driven by a control signal $S_N$ to be outputted from the timing circuit.

The first gate driving-use clamping circuit 32 is composed of a capacitor 34, a resistance 35 and a diode 36, wherein the cathode of the diode 36 is connected to the S terminal of the Pch-MOS type FET 28, while the anode thereof is connected to the G terminal.

The second gate driving-use clamping circuit 33 is composed of a capacitor 37, a resistance 38 and a diode 39, wherein the cathode of the diode 39 is connected to the G terminal of the Nch-MOS type FET 29, while the anode thereof is connected to the S terminal.

The second switching circuit 25 corresponds to the respective switches 8a, 8b and 8c of the first circuit section 3, the second circuit section 4 and the third circuit section 5 of FIG. 1. As provided in the first switching circuit 24, the second switching circuit 25 is provided with a Pch-MOS type FET 40 (MOS type FET) and a Nch-MOS type FET 41 (MOS type FET) as switching elements. Between the source (S) terminal and the drain (D) terminal of the Pch-MOS type FET 40, a parasitic diode 42 is generated by the back gate effect of the Pch-MOS type FET 40. On the other hand, between the S terminal and the D terminal of the Nch-MOS type FET 41, a parasitic diode 43 is generated by the back gate effect of the Nch-MOS type FET 41. Namely, the cathode of the parasitic diode 42 is connected to the S terminal of the Pch-MOS type FET 40, and the anode is connected to the D terminal of the Pch-MOS type FET 40. On the other hand, the cathode of the parasitic diode 43 is connected to the D terminal of the Nch-MOS type FET 41, and the anode thereof is connected to the S terminal of the Nch-MOS type FET 41.

The second switching circuit 25 is provided with the first gate driving-use clamping circuit 44 and the second gate driving-use clamping circuit 45. The first gate driving-use clamping circuit 44 is provided for applying a voltage to a gate (G) terminal of the Pch-MOS type FET 40, while the second gate driving-use clamping circuit 45 is provided for applying a voltage to the G terminal of the Nch-MOS type FET 41.

The first gate driving-use clamping circuit 44 is driven by a control signal $S_p$ to be outputted from the timing circuit (to be described later), while the second driving-use clamping circuit 45 is driven by a control signal $S_N$ to be output from the timing circuit.

The first gate driving-use clamping circuit 44 is composed of a capacitor 46, a resistance 47 and a diode 48. The second gate driving-use clamping circuit 45 is composed of a capacitor 49, a resistance 50 and a diode 51.

As shown in FIG. 4, the Pch-MOS type FET 28 and the Nch-MOS type FET 29 are connected to the terminal a, and therefore, a positive voltage is applied. Accordingly, in the Pch-MOS type FET 28 and the Nch-MOS type FET 29, normal ON/OFF operations are carried out. Therefore, the parasitic diode 30 and the parasitic diode 31 are not set in the ON state.

On the other hand, the Pch-MOS type FET 40 and the Nch-MOS type FET 41 are connected to the terminal b, and therefore, a negative voltage is applied. Accordingly, the Pch-MOS type FET 40 and the parasitic diode 42 are simultaneously set ON, and Nch-MOS type FET 41 and the parasitic diode 43 are simultaneously set ON. Therefore, a current flows in an opposite direction to the flow in the normal operation.

When transferring the voltage $V_s$ of the terminal voltage supply source 1 to the capacitor 26, the respective first gate driving-use clamping circuits 32 and 44 of the switching circuits 24 and 25 are driven based on a control signal $S_p$ from the timing circuit (to be described later), and Pch-MOS type FET 28, Pch-MOS type FET 40 and the parasitic diode 42 are set ON. In the meantime, the second gate driving-use clamping circuits 33 and 45 are driven by a control signal $S_N$, and the Nch-MOS type FET 29, Nch-MOS type FET 41 and the parasitic diode 43 are set OFF. On the other hand, when transferring a charge from the capacitor 26 to the capacitor 27, the respective first gate driving-use clamping circuits 32 and 44 of the switching circuits 24 and 25 are driven by a control signal $S_p$, and the Pch-MOS type FET 28, the Pch-MOS type FET 40 and the parasitic diode 42 are set OFF. In the meantime, the second gate driving-use clamping circuits 33 and 45 are driven by a control signal $S_N$, and the Nch-MOS type FET 29, Nch-MOS type FET 41 and the parasitic diode 43 are set ON.

As shown in FIG. 5, the timing circuit for outputting the control signal $S_p$ and the control signal $S_N$ are composed of an oscillator 52, NOT circuits 53 and 54, a NAND circuit 55 and an AND circuit 56. The NAND circuit 55 and the AND circuit 56 are respectively connected to delay circuits 57 and 58 so that the switching of the control signal $S_p$ and the control signal $S_N$ between a High level (H) and a Low level (L) are not overlapped. Additionally, the delay circuits 57 and 58 may be integration circuits, for example, composed of C (capacitor) and R (resistance).

Figures 6A, 6B:
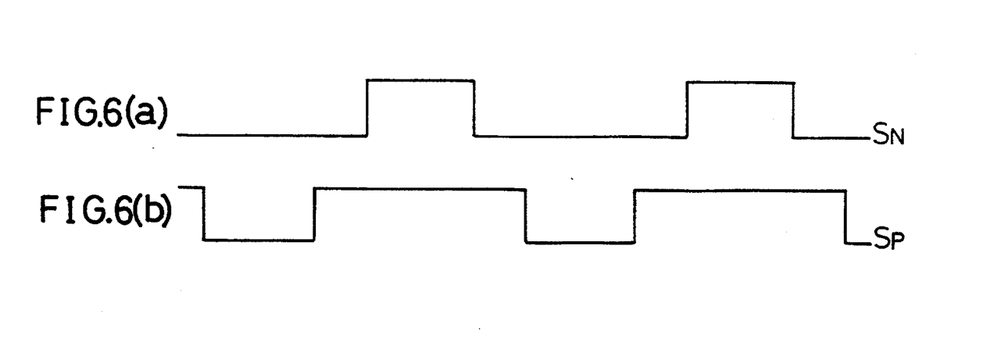

The control signal $S_p$ and the control signal $S_N$ are respectively output at timing shown in the timing charts of FIG. 6(a) and FIG. 6(b).

As described, according to the first circuit section 21, the second circuit section 22 and the third circuit section 23 having the described arrangements, only the Pch-MOS type FET 28 and the Nch-MOS type FET 29 provided in the first switching circuit 24 are switched ON/OFF, while the parasitic diodes 30 and 31 are always maintained in the OFF state. Moreover, the Pch-MOS type FET 40 and the Nch-MOS type FET 41 provided in the second switching circuit 25 are driven in accordance with the switching of the parasitic diodes 42 and 43, thereby enabling charge to be transferred to the capacitors 26 and 27 with little loss. The described arrangement for example offers an improved conversion efficiency compared with the case of switching using the diode instead of using the MOS type FET. As a result, an electric power required for transferring the charge stored in the capacitor 26 to the capacitor 27 to be stored therein can be reduced, thereby enabling a low power consumption of the entire device.

Next, the results of comparison between the power consumption in the liquid crystal display device using the drive voltage generating device 14 of the present invention and the power consumption in the liquid crystal display device using the drive voltage generating device provided with the conventional operational amplifier 101 shown in FIG. 10 will be explained below.

For the liquid crystal display panel, a 4.7 inch panel with 320×240 dot and a pitch of 0.30 mm is used. The power consumption of the liquid crystal device is measured with the duty ratio of 1/16 when a zigzag pattern of 4 bits which gives the greatest power consumption is shown.

As a result of this measurement, a power consumption of each section of the liquid crystal display using the conventional drive voltage generating device provided with the operational amplifier are as follows:

logic section: 12 mw driver section: 99 mW logic section: 5 V actuating part of common and segment drivers driver section: 23 V actuating part of segment and common drivers and the drive voltage generating device (details in the driver section)

loss in the operational amplifier section of the drive voltage generating device: 84 mW     loss in the driver IC section of the segment and common side driver: 8 mW loss in charging and discharging for a liquid crystal capacitive component: 7 mW The results show that in the power consumption of the liquid crystal display device, loss in the operational amplifier section occupies an overwhelmingly large proportion.

A power consumption of each section of the liquid crystal display using the drive voltage generating device 14 of the present embodiment are as follows:

logic section: 12 mW driver section: 21 mW a switching frequency $f_0$ of each of the switches 6a–6c and 8a–8c: 1.3 kHz (details in the driver section)
  loss in the driver IC section of the segment and common drivers: 8 mW
  loss in charging and discharging for a liquid crystal capacitive component: 7 mW The results show that the power consumption in the driver section can be reduced by the amount of loss in the operational amplifier section. Additionally, a power of 6 mW is consumed for driving the switches 6a, 6b and 6c and the switches 8a, 8b and 8c out of 21 mW power to be consumed in the driver section.

Therefore, when comparing only the driver sections, the ratio of the power consumption in the driver section in the liquid crystal display device of the present embodiment to the power consumption in the driver section in the conventional liquid crystal display device is as follows:

21/99=1/4.7.

When comparing the entire liquid crystal display devices, the ratio of the power consumption in the liquid crystal display device of the present embodiment to the power consumption in the conventional liquid crystal display device as follows:

(12+21)/(12+99)=1/3.4.

As describe, the liquid crystal display device of the present embodiments offers a large reduction in the power consumption.

Furthermore, when the voltage of the logic section is altered from 5 V to 3 V, the power consumption in the logic section becomes 1/2.8. In this case, the power consumption of the entire liquid crystal display device is still improved as follows:

((12+6)×1/2.8+15)/111=22/111=1/5.1.

[EMBODIMENT 2]

Figure 7:
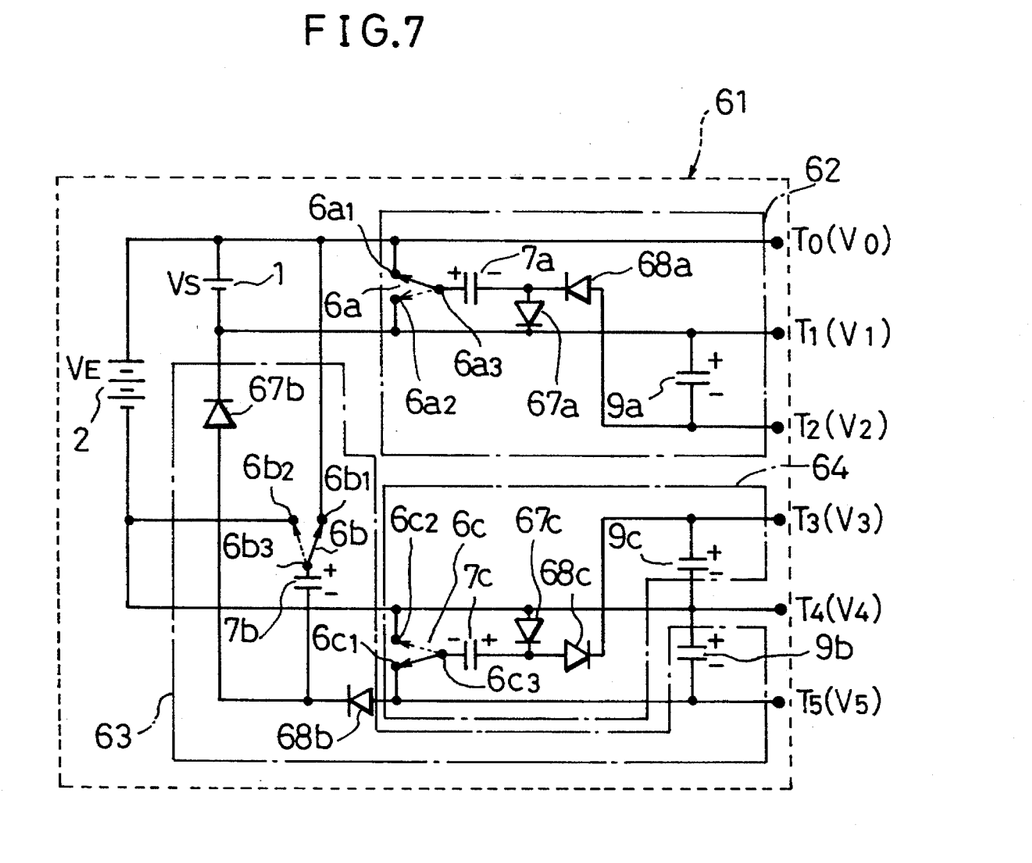
FIG. 7 is a circuit diagram of the drive voltage generating device of the liquid crystal display device in accordance with another embodiment of the present invention.

The following descriptions will discuss another embodiment of the present invention in reference to FIG. 7.

In the present embodiment, a drive voltage generating device 61 shown in FIG. 7 is used instead of the drive voltage generating device 14 for the liquid crystal display device shown in FIG. 2 used in the first embodiment. For convenience in the explanations, members having the same functions as those in the previous embodiments will be designated by the same reference numerals, and thus the descriptions thereof shall be omitted here. As shown in FIG. 7, the drive voltage generating device 61 is provided with a terminal voltage supply source 1 having an output voltage of $V_S$ and an actuating voltage supply source 2 having an output voltage of $V_E$ as in the case of the drive voltage generating device 14 of FIG. 1. The drive voltage generating device 61 is further provided with a first circuit section 62 (circuit section), a second circuit section 63 (circuit section) and a third circuit section 64 (circuit section) respectively replacing the first circuit section 3, the second circuit section 4 and the third circuit section 5 of FIG. 1.

The terminal voltage supply source 1 is provided for supplying an output voltage to each of the output terminals $T_0$ through $T_5$, wherein the anode thereof is connected to the output terminal $T_0$, while the cathode thereof is connected to the output terminal $T_1$. The actuating voltage supply source 2 is provided for applying an actuating voltage to a liquid crystal display panel 11 when a negative voltage is applied, wherein the anode thereof is connected to the output terminal $T_0$, while the cathode thereof is connected to the output terminal $T_4$. Here, the respective output voltage from the output terminals $T_0$ through $T_5$ are designated by $V_0$ through $V_5$.

The first circuit 62 is provided with a switch 6a, a capacitor 7a, a diode 67a, a diode 68a and a capacitor 9a. The switch 6a switches after storing the charge of the terminal voltage supply source 1 in the capacitor 7a, for transferring the charge to the capacitor 9a. The switch 6a is, for example, composed of switching elements such as a transistor, FET, etc.

The switch 6a is composed of a fixed terminal $6a_1$, a fixed terminal $6a_2$ and a switching terminal $6a_3$. The fixed terminal $6a_1$ is connected to the output terminal $T_0$, and the fixed terminal $6a_2$ is connected to the output terminal $T_1$. The switching terminal $6a_3$ is provided for switching the connecting end of the capacitor 7a between the fixed terminal $6a_1$ and the fixed terminal $6a_2$.

The capacitor 7a is provided for temporarily storing therein a voltage $V_s$, i.e., the charge of the terminal voltage supply source 1. One end of the capacitor 7a is connected to the switching terminal $6a_3$ of the switch 6a, and the other end thereof is connected to the anode of the diode 67a and the cathode of the diode 68a.

The diode 67a and the diode 68a constitute the switching means with the switch 6a, and after storing the charge of the terminal voltage supply source 1 in the capacitor 7a, the diodes 67a and the diode 68a function as a switch for transferring the charge to the capacitor 9a. In the diode 67a, the cathode is connected to the output terminal $T_1$, while in the diode 68a, the anode is connected to the output terminal $T_2$. The capacitor 9a is provided for applying a voltage across the output terminals $T_1$ and $T_2$, which is to be finally applied to the liquid crystal display panel 11. The capacitor 9a is provided between the output terminals $T_1$ and $T_2$.

The second circuit section 63 is provided with a switch 6b, a capacitor 7b, a diode 67b, a diode 68b and a capacitor 9b which respectively correspond to the switch 6a, the capacitor 7a, the diode 67a, the diode 68a and the capacitor 9a of the first circuit section 62. The connections among the switch 6b, the capacitor 7b, the diode 67b and the diode 68b are the same as the connections among the switch 6a, the capacitor 7a, the diode 67a and the diode 68a.

In the switch 6b, the fixed terminal $6b_1$ is connected to the output terminal $T_0$, and the fixed terminal $6b_2$ is connected to the output terminal $T_4$. In the diode 67b, the cathode thereof is connected to the output terminal $T_1$, while in the diode 68b, the anode thereof is connected to the output terminal $T_5$. The capacitor 9b is provided between the output terminals $T_4$ and $T_5$.

The third circuit section 64 is provided with the switch 6c, the capacitor 7c, the diode 67c, the diode 68c and the capacitor 9c respectively correspond to the switch 6a, the capacitor 7a, the diode 67a, the diode 68a and the capacitor 9a of the first circuit section 62. The connections among the switch 6c, the capacitor 7c, the diode 67c and the diode 68c are the same as the connections among the switch 6a, the capacitor 7a, the diode 67a and the diode 68a.

In the switch 6c, the fixed terminal $6c_1$ is connected to the output terminal $T_5$, and the fixed terminal $6c_2$ is connected to the output terminal $T_4$. In the diode 67c, the anode thereof is connected to the output terminal $T_4$, while in the diode 68c, the cathode thereof is connected to the output terminal $T_3$. The capacitor 9c is provided between the output terminals $T_3$ and $T_4$.

The switches 6a, 6b and 6c are controlled to be switched in one direction simultaneously by control means (not shown).

In the described arrangement, the operation of the first circuit section 62 when the drive voltage generating device 61 of the present embodiment is activated will be explained below.

First, the switching terminal $6a_3$ of the switch $6a$ is switched to the side of the fixed terminal $6a_2$ as shown in the solid line in the figure.

Therefore, the current flows as follows: the terminal voltage supply source 1→the switch $6a$→the capacitor $7a$→the diode $67a$→the terminal voltage supply source 1. As a result, the charge having the polarity shown in the figure is stored in the capacitor $7a$. Therefore, the described switching period for the switch $6a$ corresponds to the charging period, and in the steady state, a voltage across the capacitor $7a$ is $V_S$.

Next, the switching terminal $6a_3$ of the switch $6a$ is switched to the side of the fixed terminal $6a_2$ as shown in a short dashed line in the figure. Here, in the second circuit section 63 and the third circuit section 64, the respective switching terminals $6b_3$ and $6c_3$ of the switches $6b$ and $6c$ are switched to the side of the fixed terminals $6b_2$ and $6c_2$.

Therefore, the current flows as follows: the capacitor $7a$→the switch $6a$→the capacitor $9a$→the diode $68a$→the capacitor $7a$. Here, the described switching period for the switch $6a$ corresponds to the discharging period. In this case, charge is stored in the capacitors $7a$ and $9a$ in an amount corresponding to the capacity ratio of the capacitor $7a$ to the capacitor $9a$, and the voltages across the two capacitors $7a$ and $9a$ become identical. For example, when the charge originally stored in the capacitor $9a$ is 0, and the electrostatic capacity of the capacitors $7a$ and $9a$ is $C_0$, the charges to be stored in the capacitors $7a$ and $9a$ is $C_0 V_s/2$.

Therefore, in accordance with the switching of the switch $6a$, the charging and discharging operations are repeated. As a result, the voltage $V_a$ across the capacitor $9a$ is converged to $V_s$ as shown in the following equation. It is assumed here that the forward voltage of the diodes $67a$ and $68a$ is small enough to be ignored.

$$V_a = V_s(\tfrac{1}{2} + \tfrac{1}{4} + \tfrac{1}{8} + \tfrac{1}{16} + \ldots) \to V_s \quad (5)$$

Therefore, a voltage between the output terminals $T_0$ and $T_1$ and the voltage between the output terminals $T_1$ and $T_2$ become $V_S$.

On the other hand, when a load is connected to the capacitor $9a$, as the time required for charging the capacitor $7a$ to the voltage $V_S$ is short, the charge period can be set insignificantly shorter compared with the discharging period. In this case, the variation in the output voltage, i.e., the ripple voltage $\Delta V$ can be calculated through the following equation:

$$\Delta V = I_0/(2C_0 f_0) \quad (6)$$

wherein $I_0$(A) and $f_0$(Hz) respectively represent the average load current and the switching frequency of the switch $6a$.

Accordingly, the switching frequency $f_0$ of the switch $6a$ and the electrostatic capacity $C_0$ of the capacitors $7a$ and $9a$ may be set based on the average load current $I_0$ and the ripple voltage $\Delta V$ as desired.

Additionally, the respective operations of the second circuit section 63 and the third circuit section 64 are almost the same as the operation of the first circuit section 62. More specifically, in the second circuit section 63, the current flows in the charging period as follows: the terminal voltage supply source 1→the switch $6b$ →the capacitor $7b$ the diode $67b$ →the terminal voltage supply source 1. As a result, the capacitor $7b$ is charged so as to have the polarity shown in the figure. On the other hand, in the discharging period, the current flows as follows: the capacitor $7b$→the switch $6b$→the capacitor $9b$→the diode $68b$→the capacitor $7b$. As a result, the voltage between the output terminals $T_4$ and $T_5$ becomes $V_S$. The connecting end of the switching terminal $6b_3$ of the switch $6b$ in the discharging period and the connecting end of the plus charge storing side of the capacitor $9b$ are on the cathode side of the actuating voltage supply source 2. With this connection, a voltage across the actuating voltage supply source 2 and the output terminal $T_5$ becomes $V_s$. With the described operation, the voltage between the output terminals $T_0$ and $T_5$ becomes $(V_E + V_S)$.

Similarly, in the third circuit section 64, the current flows in the charging period as follows: the capacitor $9b$→the diode $67c$→the capacitor $7c$→the switch $6c$→the capacitor $9b$. As a result, the capacitor $7c$ is charged so as to have the polarity shown in the figure. On the other hand, in the discharging period, the current flows as follows: the capacitor $7c$→the diode $68c$→the capacitor $9c$→the switch $6c$→the capacitor $7c$. As a result, the voltage across the output terminals $T_3$ and $T_4$ becomes $V_S$.

As described, the drive voltage generating device 61 of the present embodiment is arranged such that the voltage between each set of output terminals $T_0$ and $T_1$, $T_1$ and $T_2$, $T_3$ and $T_4$, and $T_4$ and $T_5$ is set to $V_S$, and the voltage between output terminals $T_0$ and $T_5$ is set to $(V_E + V_S)$. Additionally, when $T_0$ is set to GND, the bias ratio B in driving liquid crystal and the peak drive voltage $V_{op}$ can be obtained respectively through the following equations:

$$1/B = V_S/(V_0 - V_S) \quad (7)$$

$$V_{op} = V_E + V_S \quad (8)$$

[EMBODIMENT 3]

Figure 8:
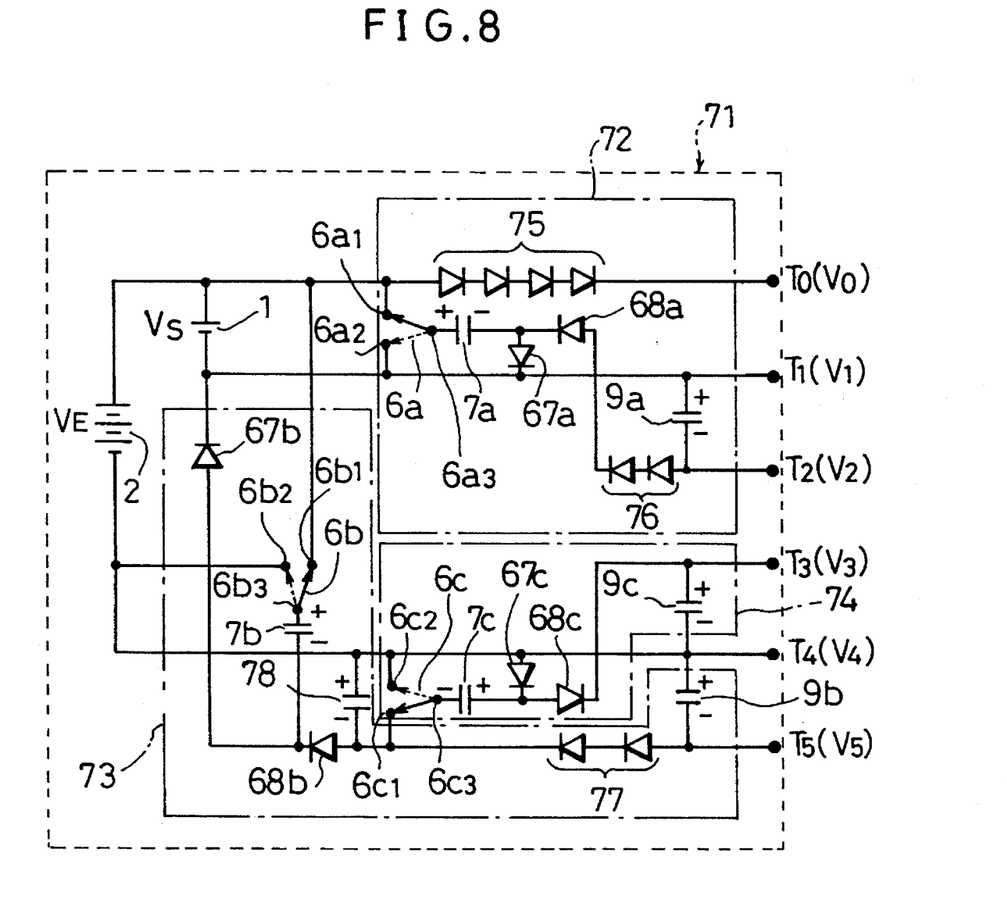
FIG. 8 is a circuit diagram of the drive voltage generating device for the liquid crystal display device in accordance with still another embodiment of the present invention.

The following descriptions will discuss still another embodiment of the present invention in reference to FIG. 8. For convenience in the explanations, members having the same functions as those in the previous embodiments will be designated by the same reference numerals, and thus the descriptions thereof shall be omitted here.

As shown in FIG. 8, a drive voltage generating device 71 of the present embodiment is provided with a first circuit section 72 (circuit section), a second circuit section 73 (circuit section) and a third circuit section 74 (circuit section) respectively replacing the first circuit section 62, the second circuit section 63 and the third circuit section 64 of the drive voltage generating device 61 shown in FIG. 7.

In the first circuit section 72, a diode group 75 consisting of four diodes is provided along the feeding path which connects the fixed terminal $6a_1$ of the switch $6a$ and the output terminal $T_0$. The four diodes are connected in series in such a way that a direction from the fixed terminal $6a_1$ of the switch $6a$ to the output terminal $T_0$ is the forward direction. In the first circuit section 72, a diode group 76 consisting of two diodes is provided along the feeding path which connects the capacitor $9a$ and the diode $68a$. The two diodes are connected in series in such a way that a direction from the capacitor $9a$ to the diode $68a$ is the forward direction.

In the second circuit section 73, a diode group 77 consisting of two diodes is provided along the feeding path which connects the capacitor $9b$ and the diode $68b$. The two diodes are connected in series in such a way that the direction from the capacitor $9b$ to the diode $68b$ is the forward direction. The second circuit section 73 is provided with a capacitor 78. One end of the capacitor 78 is connected between the fixed terminal $6b_2$ of the switch $6b$ and the fixed terminal $6c_2$ of the switch $6c$, while the other end thereof is connected between the fixed terminal $6c_1$ of the switch 6 and the diode $68b$.

In the described arrangement, a voltage $V_S$ generated from the terminal voltage supply source 1 is supplied between the output terminals $T_0$ and $T_1$ through the diode group 75, i.e., the four diodes.

The voltage $V_s$ generated from the terminal voltage supply source 1 is supplied across the output terminals $T_1$ and $T_2$ through the four diodes: a diode 67a used in the charging period of the first circuit section 72, the diode group 76, i.e., the two diodes used in the discharge period of the first circuit section 72, and the diode 68a.

The voltage $V_S$ generated from the terminal voltage supply source 1 is supplied across the output terminals $T_4$ and $T_5$ through four diodes: the diode 67b used in the charging period of the second circuit section 73, the diode group 77, i.e., two diodes used in the discharging period of the second circuit section 73 and the diode 68b. During the discharging period of the second circuit section 73, the capacitor 78 is charged as well as the capacitor 9b.

In the charging period of the third circuit section 74, a current flows as follows: the capacitor 78→the diode 67c→ the capacitor 7c→the switch 6c→the capacitor 78. As a result, the capacitor 7c is charged. On the other hand, in the discharging period, the current flows as follows: the capacitor 7c→ the diode 68c→the capacitor 9c→the switch 6c the capacitor 7c. As a result, the capacitor 9c is charged. Therefore, the voltage $V_S$ generated from the terminal voltage supply source 1 is supplied across the output terminals $T_3$ and $T_4$ through the four diodes: the diode 67b used in the charging period in the second circuit section 73, the diode 68b used in the discharging period in the second circuit section 73, the diode 67c used in the charging period of the third circuit section 74 and the diode 68c used in the discharging period of the third circuit section 74.

As described, in the drive voltage generating device 71 of the present embodiment, the voltage $V_S$ is supplied between each pair of the output terminals $T_0$ and $T_1$, $T_1$ and $T_2$, $T_3$ and $T_4$, and $T_4$ and $T_5$ through four diodes respectively, namely through the same number of diodes. Therefore, a voltage between each pair of terminals can be set to the same voltage with high accuracy.

In practice, the diode lowers the forward voltage. For example, in the case of a silicone diode, the forward voltage is dropped by approximately 0.7 v. Therefore, when activating the liquid crystal display device having the voltage $V_S$ of several volts, the drop in the forward voltage greatly affects the voltage between terminals. Therefore, in the drive voltage generating device 71 of the present embodiment, the diode groups 75 through 77 are additionally provided to the drive voltage generating device 61 so as to set the voltage between each pair of the terminals equal to $(V_S - 0.7 \times 4)$ V. Additionally, the bias ratio for achieving a desirable contrast of the display screen should be calculated by $(V_S - 2.8)$ V instead of $V_S$.

[EMBODIMENT 4]

Figure 9:
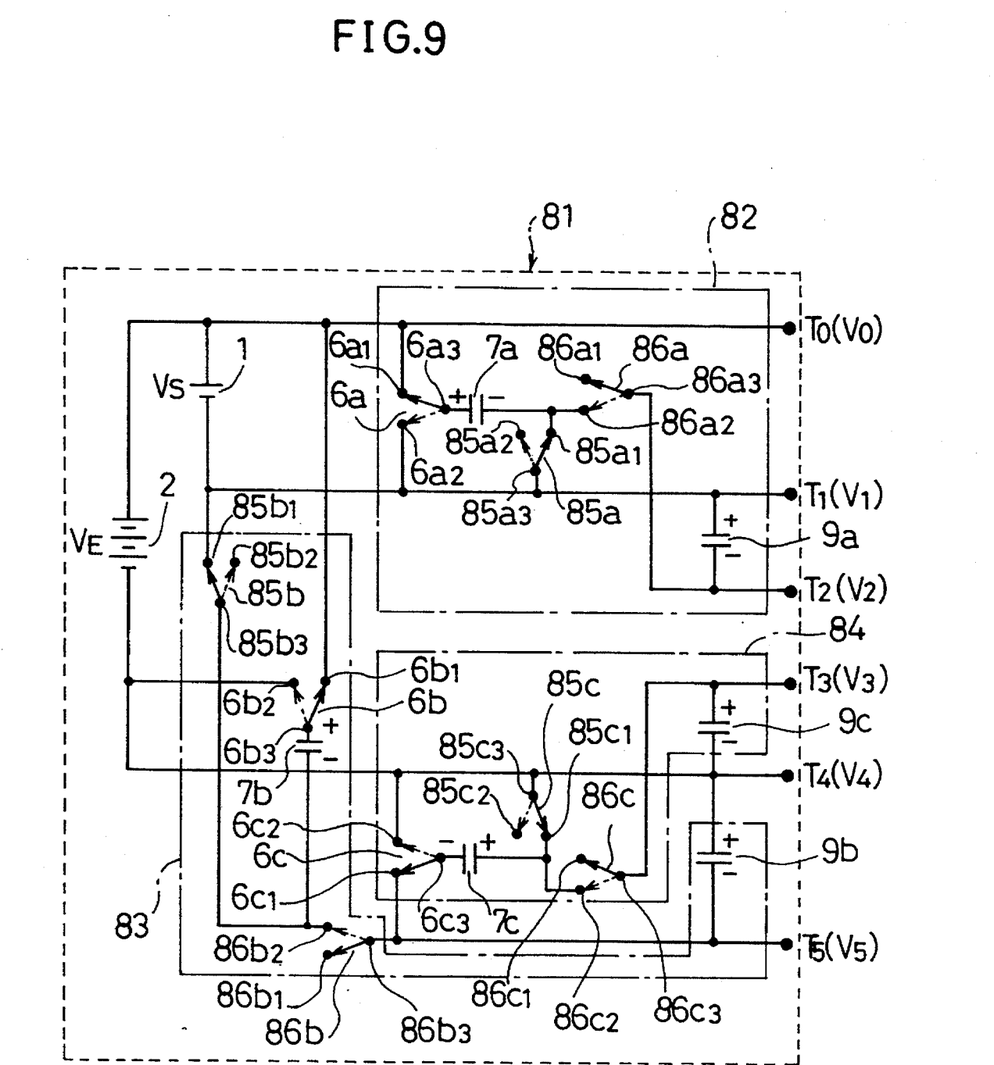
FIG. 9 is a circuit diagram of the drive voltage generating device of the liquid crystal display device in accordance with still another embodiment of the present invention.

The following descriptions will discuss still another embodiment of the present invention in reference to FIG. 9. For convenience in the explanations, members having the same functions as those in the previous embodiments will be designated by the same reference numerals, and thus the descriptions thereof shall be omitted here.

As shown in FIG. 9, a drive voltage generating device 81 of the present embodiment is provided with a first circuit section 82 (circuit section), a second circuit section 83 (circuit section) and a third circuit section 84 (circuit section) respectively replace the first circuit section 62, the second circuit section 63 and the third circuit section 64 of the drive voltage generating device 61 shown in FIG. 7.

The first circuit section 82 is provided with a switch 85a (switching means) and a switch 86a (switching means) respectively replacing the diode 67a and the diode 68a. The second circuit section 83 is provided with a switch 85b (switching means) and a switch 86b (switching means) respectively replacing the diode 67b and the diode 68b. The third circuit section 84 is provided with a switch 85c (switching means) and a switch 86c (switching means) replacing the diode 67c and the diode 68c. The switches 85a, 85b and 85c are respectively provided with fixed terminals $85a_1$, $85b_1$ and $85c_1$, fixed terminals $85a_2$, $85b_2$ and $85c_2$ and switching terminals $85a_3$, $85b_3$ and $85c_3$. Similarly, the switches 86a, 86b and 86c are respectively provided with fixed terminals $86a_1$, $86b_1$ and $86c_1$, the fixed terminals $86a_2$, $86b_2$ and $86c_2$, and switching terminals $86a_3$, $86b_3$ and $86c_3$.

In the switches 85a, 85b and 85c and the switches 86a, 86b and 86c, in the charging period, the switching terminals $85a_3$, $85b_3$ and $85b_3$ and the switching terminals $86a_3$, $86b_3$ and $86c_3$ are respectively switched to the side of the fixed terminals $85a_1$, $85b_1$ and $85c_1$ and the fixed terminals $86a_1$, $86b_1$ and $86c_1$ as shown in the solid line in the figure, while in the discharging period, switched to the side of the fixed terminals $85a_2$, $85b_2$ and $85c_2$ and the fixed terminals $86a_2$, $86b_2$ and $86c_2$ by being controlled by control means (not shown) as shown by a short dashed line in the figure. Therefore, in the drive voltage generating device 81 of the present invention, the capacitors 7a, 7b and 7c and the capacitors 9a, 9b and 9c are charged and discharged through the same path as the previous drive voltage generating device 61. As a result, the voltage between each pair of output terminals $T_0$ and $T_1$, $T_1$ and $T_2$, $T_3$ and $T_4$, and $T_4$ and $T_5$ is set to $V_S$, and the voltage between the output terminals $T_0$ and $T_5$ is set to $(V_E + V_S)$.

As described, in the arrangement where the switch is provided in replace of each diode, the problem that a voltage between each pair of output terminals differs due to the drop in the voltage in each diode can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A drive voltage generating device for a liquid crystal display device, comprising:

a voltage supply source which generates a prescribed voltage;

first charge storing means for storing therein a charge supplied from said voltage supply source;

second charge storing means, corresponding to said first charge storing means, for storing therein a charge transferred from said first charge storing means;

an output terminal section including a plurality of output terminals which supply a voltage required for driving a liquid crystal display section, receiving said prescribed voltage from said second charge storing means through a predetermined pair of output terminals of said plurality of output terminals; and switching means for switching a connection between said voltage supply source and said first charge storing means and a connection between said first charge storing means and said second charge storing means so that a charge is supplied to said first charge storing means from said voltage supply source and that a charge stored in said first charge storing means is transferred to said second charge storing means, said switching means comprising two switching circuits, each being provided with a MOS type FET, the MOS type FET provided in one of said switching circuits not being driven in accordance with a switching of a parasitic diode generated by a back gate effect of the MOS type FET, the MOS type FET of the other switching circuit being driven in accordance with a switching of a parasitic diode generated by the back gate effect of the MOS type FET.

2. The drive voltage generating device for a liquid crystal display device as set forth in claim 1, wherein:

a substantially equal voltage is supplied between each pair of output terminals.

3. The drive voltage generating device for a liquid crystal display device as set forth in claim 2, wherein:

the voltage supplied between each pair of output terminals is set substantially equal to a voltage generated from said voltage supply source.

4. The drive voltage generating device for a liquid crystal display device as set forth in claim 1, wherein:

said first charge storing means and said second charge storing means respectively include capacitors, and in said first charge storing means, a charge supplied from said voltage supply source is stored in a capacitor, while in said second charge storing means, a charge transferred from said first charge storing means is stored in a capacitor.

5. The drive voltage generating device for a liquid crystal display device as set forth in claim 1, further comprising three circuit sections, each circuit section including said first charge storing means, said second charge storing means and said switching means.

6. The drive voltage generating device for a liquid crystal display device as set forth in claim 1, further comprising a plurality of circuit sections, each circuit section including said first charge storing means, said second charge storing means and said switching means.

7. The drive voltage generating device for a liquid crystal display device as set forth in claim 6, wherein:

said switching means simultaneously switches for all of said second charge storing means from a state where said voltage supply source and said first charge storing means are connected to a state where said first charge storing means and said second charge storing means are connected; and said switching means simultaneously switches for all of said second charge storing means from the state where said first charge storing means and said second charge storing means are connected to the state where said voltage supply source and said first charge storing means are connected.

8. The drive voltage generating device for a liquid crystal display device as set forth in claim 6, further comprising another voltage source supplying another prescribed voltage to a predetermined number of said plurality of output terminals.

9. The drive voltage generating device for a liquid crystal display as set forth in claim 8, wherein potential of each output terminal can be expressed as follows:

$$V_0, V_0-V_S, V_0-2V_S, \ldots, V_0-(n-1)V_S, V_0-V_E, V_0-(V_E+V_S), V_0-(V_E+2V_S), \ldots, V_0-\{V_E+(n-1)V_S\},$$

wherein $V_S$ represents said prescribed voltage, $V_E$ represents said another prescribed voltage, $V_0$ represents a potential of one of said output plurality of output terminals, and 2n represents a number of said plurality of output terminals.

10. The drive voltage generating device for a liquid crystal display as set forth in claim 8, wherein a potential of each output terminal can be expressed as follows:

$$V_0, V_0+V_S, V_0+2V_S, \ldots, V_0+(n-1)V_S, V_0+V_E, V_0+(V_E+V_S), V_0+(V_E+2V_S), \ldots, V_0+\{V_E+(n-1)V_S\},$$

wherein $V_S$ represents said prescribed voltage, $V_E$ represents said another prescribed voltage, $V_0$ represents a potential of one of said plurality of output terminals, and 2n represents a number of said plurality of output terminals.

11. A method of generating a drive voltage for a liquid crystal display device, comprising the steps of:

generating a prescribed voltage from a voltage supply source;

storing said prescribed voltage in a first charge storage;

storing a charge transferred from said first charge storage in a second charge storage;

switching a connection between said voltage supply source and said first charge storage and a connection between said first charge and said second charge storage by first and second switching circuits;

driving a MOS type FET in said second switching circuit in accordance with a switching of a parasitic diode generated the back gate effect of the MOS type FET;

not driving a MOS type FET in said first switching circuit in accordance with a switching of a parasitic diode generated by the back gate effect of the MOS type FET; and outputting voltages from said first and second charge storage as drive voltages from a plurality of output terminals.

12. The method of generating a drive voltage for a liquid crystal display device as set forth in claim 11 further comprising:

providing a plurality of first and second charge storages;

simultaneously switching all of said second charge storages from a state where said voltage supply source and said first charge storages are connected to state where said first charge storages and said second charge storage are connected; and simultaneously switching all of said second charge storages from the state where said first charge storages and said second charge storages are connected to the state where said voltage supply source and said first charge storages are connected.

13. The method of generating a drive voltage for a liquid crystal display device as set forth in claim 11, further comprising:

providing a plurality of first and second charge storages; and supplying another prescribed voltage to some of said output terminals.

14. The method of generating a drive voltage for a liquid crystal display device as set forth in claim 13, further comprising:

providing a potential at each output terminal in the following pattern $$V_0, V_0+V_S, V_0+2V_S, \ldots, V_0+(n-1)V_S, V_0+V_E, V_0+(V_E+V_S), V_0+(V_E+2V_S), \ldots, V_0+(V_E+(n-1)V_S),$$

wherein $V_S$ represents said prescribed voltage, $V_E$ represents said another prescribed voltage, $V_0$ represents a potential of one of said output terminals, and 2n represents a number of said output terminals.

15. The method of generating a drive voltage from a liquid crystal display device as set forth in claim 12, further comprising:

providing a potential at each output terminal in the following pattern $V_0, V_0-V_S, V_0-2V_S, \ldots, V_0-(n-1)V_S, V_0-V_E, V_0-(V_E+V_S), V_0-(V_E+2V_S), \ldots, V_0-(V_E+(n-1)V_S),$ wherein $V_0$ represents said prescribed voltage, $V_E$ represents said another prescribed voltage, $V_0$ represents a potential of one of said output terminals, and 2n represents a number of said output terminals.

* * * * *